US008386920B2

(12) United States Patent
Cox et al.

(10) Patent No.: US 8,386,920 B2
(45) Date of Patent: Feb. 26, 2013

(54) METHOD AND APPARATUS FOR DATA VISUALIZATION

(75) Inventors: Kenneth Charles Cox, Naperville, IL (US); Todd Lawrence Graves, Santa Fe, NM (US); Stacie Lynn Hibino, Naperville, IL (US); Audris Mockus, Naperville, IL (US)

(73) Assignee: Alcatel Lucent, Paris (FR)

( * ) Notice: Subject to any disclaimer, the term of this patent is extended or adjusted under 35 U.S.C. 154(b) by 1313 days.

(21) Appl. No.: 09/798,179

(22) Filed: Mar. 2, 2001

(65) Prior Publication Data

US 2002/0156806 A1    Oct. 24, 2002

Related U.S. Application Data

(60) Provisional application No. 60/200,067, filed on Apr. 27, 2000.

(51) Int. Cl.
*G06F 17/00* (2006.01)
(52) U.S. Cl. .......................... 715/234; 715/704; 715/709
(58) Field of Classification Search ................ 715/501.1, 715/513, 503–504, 511, 517, 530, 709, 712–713, 715/201, 229, 234, 243, 255, 704; 395/704, 395/709, 712–713
See application file for complete search history.

(56) References Cited

U.S. PATENT DOCUMENTS

| | | | | |
|---|---|---|---|---|
| 5,937,064 A | * | 8/1999 | Eick et al. | 707/101 |
| 5,983,227 A | * | 11/1999 | Nazem et al. | 707/10 |
| 6,061,696 A | * | 5/2000 | Lee et al. | 715/513 |
| 6,549,944 B1 | * | 4/2003 | Weinberg et al. | 709/224 |
| 6,668,354 B1 | * | 12/2003 | Chen et al. | 715/517 |
| 6,938,205 B1 | * | 8/2005 | Hanson et al. | 715/234 |

OTHER PUBLICATIONS

BadBlue Adds Live Spreadsheet Sharing, Jan. 22, 2001, BadBlue Press Center, <http://www.badblue.com/p010122.htm>.*
Jones et al., Special Edition Using Microsoft Frontpage 2000, May 17, 1999, Que.*
S.L. Hibino, T. Graves, and A. Mochus, "A Web Based Approach to Interactive Visualization in Context", In *Advanced Visual Interfaces*, pp. 181-188, Palermo, Italy, May 23-26, 2000.
Eick, Mockus, Graves and Karr, "A Web Laboratory for Software Data Analysis", *World Wide Web*, v. 1, No. 2, 55-60 (1998).

* cited by examiner

*Primary Examiner* — Adam M Queler
(74) *Attorney, Agent, or Firm* — Fay Sharpe LLP (57) ABSTRACT

A data visualization system provides data visualization objects to a live document author for incorporation into a live document. The system is responsive to selection of one or more objects by incorporating the object in a hypertext markup. Objects may include view objects, such as bar charts and dynamic tables, text objects, which permit an author to guide a reader through the live document, and interaction objects which permit a reader to interact with a live document. The system also permits views to be linked by an author and interaction sessions to be saved by a reader.

6 Claims, 10 Drawing Sheets

Summary Information About Individual Drivers: (Note: you can scroll down or up and zoom in and out)

| Standings | Driver | Truck # | Mfr | Total Pts | Starts | Wins | Top 5 | Top 10 | Total$ |
|---|---|---|---|---|---|---|---|---|---|
| 1 | Sprague | 24 | Chevrolet | 3747 | 25 | 3 | 16 | 19 | 478200 |
| 2 | Biffle | 50 | Ford | 3739 | 25 | 8 | 14 | 19 | 577405 |
| 3 | Setzer | 1 | Dodge | 3639 | 25 | 3 | 11 | 19 | 452280 |
| 4 | Compton | 86 | Dodge | 3623 | 25 | 0 | 12 | 17 | 356499 |
| 5 | Sauter, Ja | 3 | Chevrolet | 3543 | 25 | 2 | 8 | 16 | 383620 |
| 6 | Wallace | 2 | Ford | 3494 | 25 | 2 | 12 | 16 | 391930 |
| 7 | Hornaday Jr | 16 | Chevrolet | 3488 | 25 | 2 | 7 | 14 | 474560 |
| 8 | Houston, A | 60 | Chevrolet | 3359 | 25 | 0 | 5 | 16 | 2535 |
| 9 | Bliss | 99 | Ford | 3284 | 25 | 1 | 6 | 13 | 299085 |
| 10 | Hensley | 43 | Dodge | 3280 | 25 | 1 | 7 | 14 | 288735 |
| 11 | Tolsma | 25 | Dodge | 3173 | 25 | 1 | 2 | 10 | 2230 |

Wins: On the left, we have a frequency distribution (bar chart) based on races won. X-axis = # of wins by a driver; y-axis = # of drivers who had that many wins. This bar chart is linked to the above values list, so we can select bars in this chart to quickly access details and explore interesting questions, such as:
- Who won the most races (and what is their rank)? (Select 9 wins) ← 812
- What ranks do drivers who won one or more races have? (Select wins > 1) ← 814
- Are there any drivers ranked among the top 10 who won no races? (Select 0 wins) ← 816

Total Winnings ($): Now we can take a look at money won with a smoothed frequency distribution (histogram) of Total$. Use the mouse to select money values within the histogram to investigate the following:
- Who makes the most money (and what are they ranked)? select more than 100K ← 818
- Who are the top four money makers and what are they ranked?
- Do you see any peculiarities in the difference between the amount of money won and the ranking of the drivers? (Investigate some of these in more detail here) ← 820

Manufacturerer: Now let's look at the manufacturers. You can click on each manufacturer's bar to view its corresponding distributions of money won, races won and driver's rankings as shown above. Alternatively, you can make selections in the above charts and then see the corresponding selections by manufacturer. Select top 11 ranks in the table above. Despite the fact that there are almost three times as many Chevrolet drivers as Dodge drivers overall, among top 11 there are similar ← 822 numbers of Dodge, Chevrolet and Ford truck drivers.

METHOD AND APPARATUS FOR DATA VISUALIZATION

The applicants claim, under 35 U.S.C. 119 (e), priority to and the benefit of provisional application entitled "A Web-Based Approach To Interactive Visualization In Context", filed on Apr. 27, 2000, U.S. Ser. No. 60/200,067.

FIELD OF THE INVENTION

The invention relates to information display and, more particularly, to information visualization systems.

BACKGROUND OF THE INVENTION

Information visualization permits analysts to gain insights that might otherwise escape them. Albert Einstein conducted a gedanken in which he visualized himself riding a beam of light and thereby achieved an insight that led to the development of the theory of relativity. Although typical information visualization applications are far more prosaic, they nevertheless provide important insights into understanding complex data, permitting analysts to, literally, see patterns within the data. With the advent and proliferation of computer networks, particularly the Internet, widespread groups of analysts may gain access to complex data for various forms of reduction. Advances in the Java programming language and in web browsers (the terms web, world wide web, WWW, Internet, and Internet II will be used interchangeably herein for convenience of explanation) allow the use of more advanced forms of information visualization through the Internet. For example, WWW versions of scientific publications may allow their readers to interact with, rather than just review, visualizations of data analysis results. Such interactive documents can present graphical results in context, as in a static, hardcopy publication, while at the same time providing an interface for directly accessing and analyzing the data first-hand. In this way, readers can confirm or disprove the author's results as well as explore the data in search of additional insights. This type of interactive document with embedded, contextual information visualization components may be referred to as a "Live Document", or LiveDoc, for short. LiveDocs are discussed, for example, by Eick, S. G., Mockus, A., Graves, T. L. and Karr, A. F. (1998), "A Web Laboratory for Software Data Analysis," In World Wide Web, 1(2), 55-60, which is hereby incorporated by reference.

In spite of their utility, significant impediments to the widespread use of such interactive documents remain. LiveDocs tend to be more difficult to compose than traditional static documents. In addition to the traditional tasks associated with writing a static document, a prospective LiveDoc author may be required to master a new programming language, design a user interface, and incorporate various LiveDoc features in the document. For many potentail LiveDoc authors, these additional burdens are a prohibitive distraction from their primary focus, such as conducting research on the content of their documents.

Not only may LiveDocs be more difficult to compose, they may be more difficult to use. Some web-based interactive visualizations focus on sophisticated, domain-specific views and some appear more like stand-alone applications that happen to be accessible through a web browser. Such visualizations can be limited to their own domains, and may force users to experience long delays downloading complex visualizations. In addition, such views are not designed for distribution in a static form, and they may require a significant expenditure of time learning the system before the users can start to gain insight from data. A reader may only have time to explore the document at a level that is comparable to what may be available from a traditional static document, or a slightly more interactive level. If the LiveDoc interface requires too much of a potential audience, whether because it's inconvenient to learn, data access is too slow, the document presentation is a radical departure from a reader's static document expectations, or for other reasons, the author risks losing a substantial portion of his potential audience.

A system and method that permits an author to create interactive documents with relative ease would therefore be highly desirable, particularly if the documents thus-produced are especially easy to use.

SUMMARY

An interactive data visualization system in accordance with the principles of the present invention provides information to a client display for analysis by a reader. Although the reader may have been involved in the development of the displayed information, the reader will typically be someone with whom the developer of the data is sharing the information. The terms client and server may be used herein to refer to computers and displays which correspond to those of a document developer and document user, respectively. The client display includes an output device, such as a cathode ray tube (CRT), liquid crystal display (LCD), or other display device and a display controller. The display controller and display device operate to display interactive documents, referred to herein as live documents or LiveDocs, which display data in a manner that assists in the visualization of the data.

The system includes a set of data visualization components and a facility for embedding these visualization components in a live document which may be available to a reader over a network, such as an intra-network, the Internet, the world wide web (WWW), or Internet II, for example. The system and method include a facility for linking the components together and for scripting the manipulation of document view options. Visualization components include view objects, such as bar charts, smoothed histograms, and dynamic tables. The visualization components may be initialized to focus on key analysis results and a facility is provided for authors to script the manipulation of a view at the user interaction level. For example, an author may script the manipulation of view options, "walking a user through" the setting of view options, selecting items within a view, or animating a view.

In one aspect of the invention, an interactive data visualization system may incorporate an interface in the form of HTML links or form-widgets positioned within a live document, with instructions and suggestions for use of the links and/or widgets included. An author may tailor the interface to present only portions of the functionality, to targeted users. An applet interface allows a web page author to embed visual presentations within the context of a web document. The applet interface permits an author to add views to a web page, or to add links or controls. Links and controls added by an author allow a reader to manipulate views according to their needs. For example, author-implanted controls may permit a reader to select subsets of data or determine the order in which data is sorted.

An interactive data visualization system in accordance with the principles of the present invention permits an author to configure options for the views, allowing an author to select the variables, data, and initial state for views to be presented to a reader. The initial state may be used to select varying levels of interactivity, to highlight, or "match", textual descriptions of "key" results, for example. In another aspect of the invention, the system automatically shares data to support an author's linking of views. The system may include a direct manipulation graphical user interface for authoring live documents, with command—level output, such as HTML and applet tags, automatically generated from an author's graphical input. The system provides data visualization objects to a live document author for incorporation into a live document. The system is responsive to selection of one or more objects by incorporating the object in a hypertext markup. Objects may include view objects, such as bar charts and dynamic tables, text objects, which permit an author to guide a reader through the live document, and interaction objects which permit a reader to interact with a live document. The system also permits views to be linked by an author and interaction sessions to be saved by a reader.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

In accordance with the principles of the present invention, a system and method for data visualization includes one or more data visualization components, or objects, and a facility for embedding such visualization components in an interactive document. The objects may include text objects, view objects, or interactive objects, for example. The system and method may include a facility for linking the components and for scripting the manipulation of document view options. Such interactive documents may be made available through computer networks, such as the world wide web (WWW), the Internet or Internet II. The system permits an author to initialize the visualization components to focus on key analysis results or script the manipulation of a view at the user interaction level. For example, an author may script the manipulation of view options to set view options, select items within a view, or animate a view.

In accordance with the principles of the present invention, an author may create an interactive document by adding objects to an empty interactive document. The objects may be text, one or more views, or one or more interactions. The author may create a text object using a word-processor or HTML editor, then add the text to the interactive document. Similarly, view objects may be created, choosing, for example, from a suite of available views (such as bar chart, spine plot, etc.) with the views added to the interactive document after creation. The author may also create and add interaction objects, which also may be selected from an available suite, to the intcrctivc interactive document. An author may edit an existing document by adding or deleting text, view, or interaction objects. In the course of creating or editing such a document, the author may "layout" the illustrations within the document by incorporating place-holding, or "dummy", images within the document. The author may then replace the dummy illustrations and controls with the actual views after exporting the document, if necessary, to HTML format. In the process of creating the document the author determines the views, the interactions permitted with those views, and the location of controls which permit a reader to manipulate the views within the confines of the permitted interactions.

Figure 1:
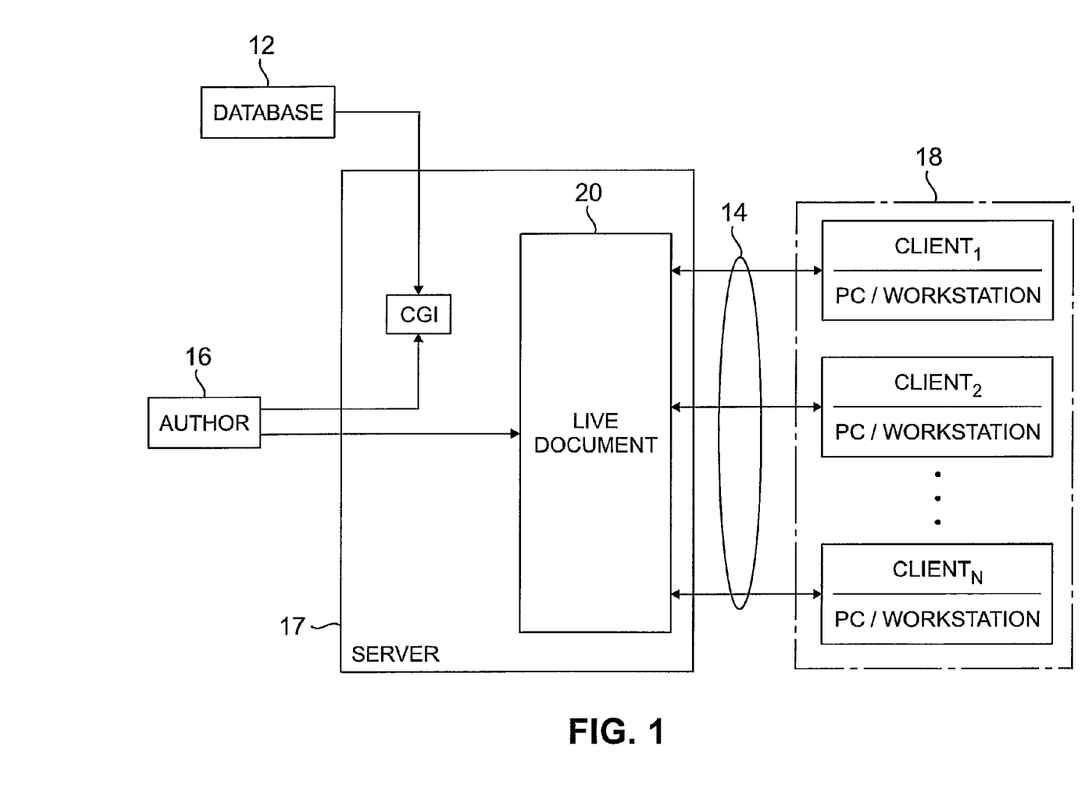
FIG. 1 is a conceptual block diagram of a data visualization system in accordance with the principles of the present invention.

In the illustrative conceptual block diagram of FIG. 1 a system in accordance with the principles of the present invention includes a database 12 that contains information for visualization, such as data or software source code, for example. An author 16 wishes to share information from the database 12 with a variety of clients 18.

The clients 18 may be researchers within the same field as the author 16, for example. The author 16 analyzes data from the database 12 and develops a document to distribute to the clients 18, through any of a variety of networks 14, such as an intranet, the Internet, or the world wide web, for example. To provide the clients 18 with a variety of visualization options for their own analyses, the author 16 creates a live document 20 which includes information from the database 12 and allows the clients 18 to perform visually interactive analyses of the data. A client may employ a computer, such as a personal computer or workstation (CLIENT1, CLIENT2, . . . CLIENTN) to access the live document 20 resident on a server 17 through a network 14. The server 17, and client computers may take the form of a general purpose computer, such as that discussed in greater detail in the discussion related to FIG. 2. The author 16 creates the live document 20.

As will be described in greater detail in relation to FIGS. 3 through 10, the author 16 may write a description of the process with the associated database in hypertext markup language (HTML) for use on the web server 17. The author may use JavaScript to create hypertext and form interactions with the HTML in order to provide the document with summaries of data and visualization tools using Java applets within the same HTML document. Java Script is discussed in, "Java Script Handbook", D. Goodman (1966), IDG books Worldwide, which is hereby incorporated by reference. Java applets are discussed in greater detail in "Java in a Nutshell", D. Flanagan (1996), O'Reilly & Associates, which is hereby incorporated by reference. Interactive visualization is discussed in U.S. Pat. No. 5,937,064 issued to Eick et al, which is hereby incorporated by reference.

Any of the clients 18 may obtain the live document by downloading HTML text and applets from the server 17 using the location on the browser specified by the author 16. The applet includes parameters specified by the author 16 and accesses the web server 17 through a common gateway interface 22.

Figure 2:
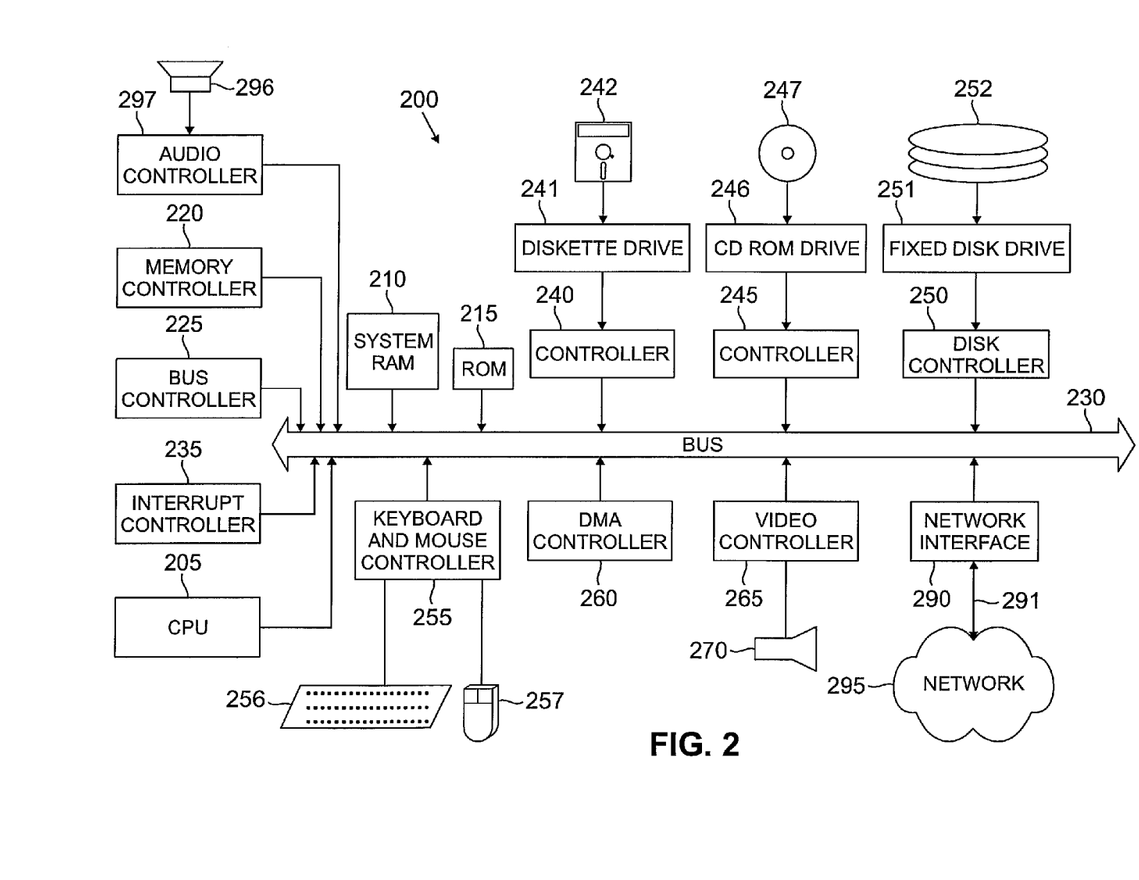
FIG. 2 is a conceptual block diagram of a computer system which may be employed in a data visualization system in accordance with the principles of the present invention.

FIG. 2 illustrates the system architecture for a computer system 200 on which the invention may be implemented. The exemplary computer system of FIG. 2 is for descriptive purposes only. Although the description may refer to terms commonly used in describing particular computer systems, the description and concepts equally apply to other systems, including systems having architectures dissimilar to FIG. 2.

Computer system 200 includes a central processing unit (CPU) 205, which may be implemented with a conventional microprocessor, a random access memory (RAM) 210 for temporary storage of information, and a read only memory (ROM) 215 for permanent storage of information. A memory controller 220 is provided for controlling RAM 210.

A bus 230 interconnects the components of computer system 200. A bus controller 225 is provided for controlling bus 230. An interrupt controller 235 is used for receiving and processing various interrupt signals from the system components.

Mass storage may be provided by diskette 242, CD ROM 247, or hard drive 252. Data and software may be exchanged with computer system 200 via removable media such as diskette 242 and CD ROM 247. Diskette 242 is insertable into diskette drive 241 which is, in turn, connected to bus 230 by a controller 240. Similarly, CD ROM 247 is insertable into CD ROM drive 246 which is, in turn, connected to bus 230 by controller 245. Hard disc 252 is part of a fixed disc drive 251 which is connected to bus 230 by controller 250.

User input to computer system 200 may be provided by a number of devices. For example, a keyboard 256 and mouse 257 are connected to bus 230 by controller 255. An audio transducer 296, which may act as both a microphone and a speaker, is connected to bus 230 by audio controller 297, as illustrated. It will be obvious to those reasonably skilled in the art that other input devices, such as a pen and/or tabloid may be connected to bus 230 and an appropriate controller and software, as required. DMA controller 260 is provided for performing direct memory access to RAM 210. A visual display is generated by video controller 265 which controls video display 270. Computer system 200 also includes a communications adaptor 290 which allows the system to be interconnected to a local area network (LAN) or a wide area network (WAN), schematically illustrated by bus 291 and network 295. An input interface 299 operates in conjunction with an input device 293 to permit a user to send information, whether command and control, data, or other types of information, to the system 200. The input device and interface may be any of a number of common interface devices, such as a joystick, a touch-pad, a touch-screen, a speech-recognition device, or other known input device.

Operation of computer system 200 is generally controlled and coordinated by operating system software. The operating system controls allocation of system resources and performs tasks such as processing scheduling, memory management, networking, and I/O services, among things. In particular, an operating system resident in system memory and running on CPU 205 coordinates the operation of the other elements of computer system 200. The present invention may be implemented with any number of operating systems, including commercially available operating systems. One or more applications, such may also run on the CPU 205. If the operating system is a true multitasking operating system, multiple applications may execute simultaneously.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise, objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs. In accordance with the principles of the present invention, OOP, or other programming techniques may be employed to implement the representation functions discussed below.

Figure 3:
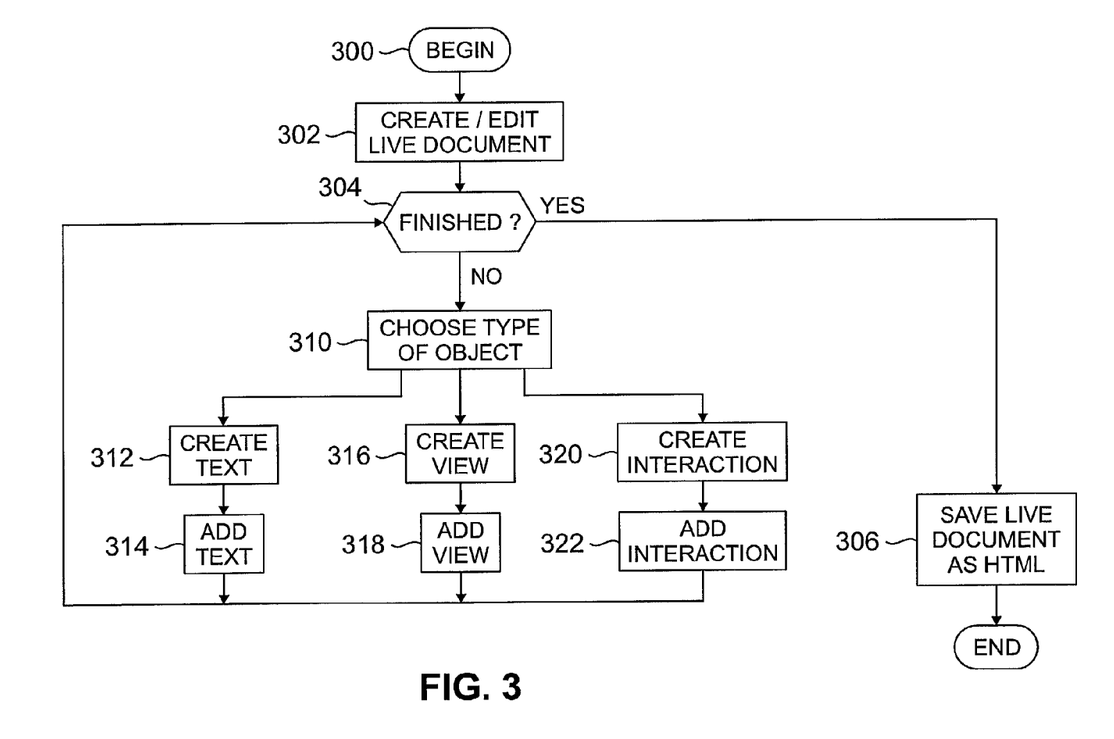
FIG. 3 is a flowchart which depicts the creation of a live document in accordance with the principles of the present invention.

The flow chart of FIG. 3 outlines the process by which a live document may be created in accordance with the principles of the present invention. It should be noted that processes illustrated through the use of flow charts herein may not be strictly linear processes and alternative flows may be implemented within the scope of the invention. The live document authoring process begins in step 300 then proceeds to step 302 where an "empty" live document is created (alternatively, an existing live document may be opened for editing in step 302). From step 302 the process proceeds to step 304 where an author indicates whether the creation/editing process is completed. This indication may come in response to a prompt, or it may be spontaneous. If the author determines that the creation/editing process is complete, the process proceeds to step 306, where the live document is saved as an HTML document and, from step 306 the process proceeds to end in step 308. On the other hand, if, in step 304, the author determines that the document creation/editing process is not completed, the process proceeds to step 310 where an author chooses the type of object he wishes to add to the live document. At this stage, the author may choose to add a text object, a view object, or an interaction object to the live document, for example. The selection made in step 310 may be in response to prompts provided by the data visualization system which may employ a graphical user interface to present object options to an author and to allow the author to select, using graphical interactions, from a variety of object types.

If, in step 310 an author determines to add a text object to the live document under development, the process proceeds from step 310 to step 312, where the author creates the desired text. The author may employ a word processor of his choice, then convert the word processor output to HTML (or, for example, extensible markup language XML) or may enter the text using HTML directly. Once the text is created in step 312, the process proceeds to step 314 where the text is incorporated into the live document and temporarily stored as a part of the document, subject to further editing. From step 314 the process returns to step 304 and from there as previously described.

If, in step 304 the author decides to add a view object, the process proceeds from step 304 to step 316 where the author creates a new view, such as a bar chart, pie chart, etc. Such a creation of a new view is described in greater detail in the discussion related to FIG. 4. After creating a new view in step 316, the process proceeds to step 318 where the author adds the new view to the live document being created/revised, by saving the updated document. From step 318 the process returns to step 304, and from there as previously described.

If the author decides in step 310 to add an interaction object, the process proceeds from step 310 to step 320 where he creates an interaction, such as changing view parameters, for example. The creation of an interaction is described in greater detail in the discussion related to FIG. 5. After creating a new interaction in step 320 the process proceeds to step 322 where the author adds the new interaction to the live document by saving the updated document. From step 322 to step 304 and from there as previously described.

Figure 4:
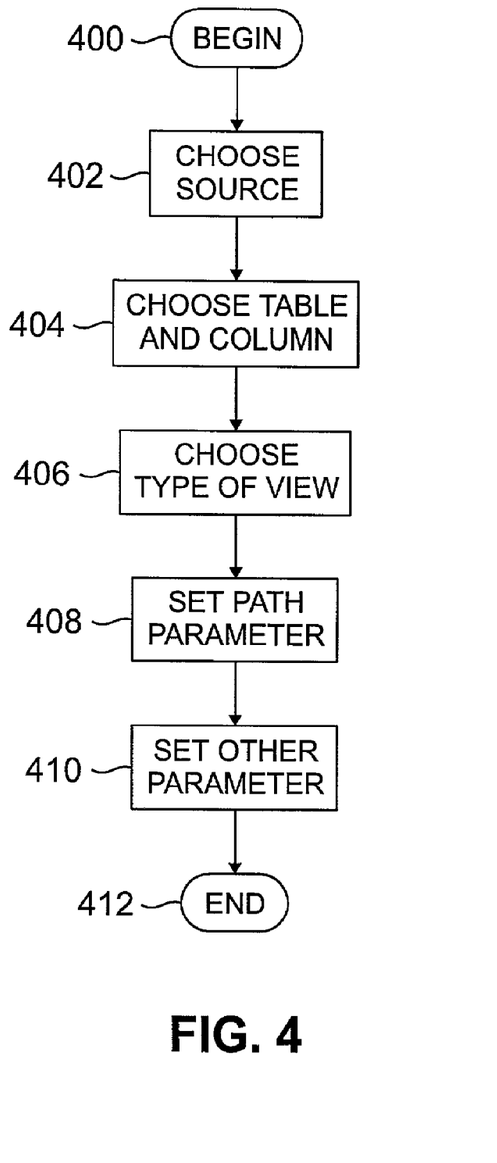
FIG. 4 is a flowchart which depicts the process of creating a view within a live document in accordance with the principles of the present invention.

The flowchart of FIG. 4 depicts in greater detail the creation of a view in accordance with the principles of the present invention that was referred to in step 316 of FIG. 3. The process of creating a view begins in step 400 and proceeds from there to step 402 where an author selects the source from which the live document will access data which is to be used in the visualization process. This selection process may be made from a list of data sources, in response to prompts from the system, or other means, and a graphical user interface may be employed by a data visualization system in accordance with the principles of the present invention to present data source options to the author. The data source may provide data that is organized in tables, for example. From step 402 the process proceeds to step 404 where the author selects a table, and one or more columns within that table, from the data source selected in step 402. Alternatively, the author may create a table at this point using non-tabulated data obtained from the source selected in step 402.

From step 404 the process proceeds to step 406 where the author chooses a type of view. Although illustrated as a single process step in FIG. 4, this may be an iterative process whereby an author experiments with different types of views before settling on a preferred view. The types of views available from a data visualization system in accordance with the principles of the present invention may include, but are not limited to: bar chart, spine plot, smoothed histogram, binned histogram, scatterplot, multidimensional plots, parallel axes plots, box plot, a spreadsheet-like values list, series views that show trend lines, graphs, networks, maps and combinations of the above. These and other components may be implemented, for example, as Java applets which are accessed by invoking their public methods. Such an applet access is supported by various Internet browsers and is referred to as LiveConnect in a Netscape browser, for example.

Bar charts may be used to indicate the number of cases (i.e., frequency distribution) for each value of a categorical variable. Linking a bar chart to other views provides added analytical power. Clicking on one or more of the bars allows a reader to select subsets of cases in all linked views. In another aspect of the invention an author may create a document in which if another linked component, for example a table or another bar chart, is used to select a subset cases, each bar is partially highlighted according to the fraction of cases in that bar that have been selected. Although bar charts may be used to show the frequency distribution of categorical variables a smoothed distribution of continuous variables may be included in a document by an author, using a histogram. Selection within a histogram is very similar to selection within a bar chart. That is, a reader may select values via direct manipulation of the histogram and selections made in other linked views are reflected through corresponding partial highlighting within the histogram.

In another aspect of the invention a dynamic table, another type of view, provides a spreadsheet-like view of the data. Each column within a dynamic table contains a variable which is measured on each of the cases shown in the rows (alternatively, each row could contain a variable which is measured on each of the cases shown in the columns). The table allows panning and zooming, so that subsets of the cases can be hidden from view. Each column of numerical data is displayed using a collection of horizontal bars, one bar per cell, where the length of a bar is proportional to the numerical value of its cell. This allows a reader to see trends across rows and relationships among columns (or vice versa). If the reader has zoomed in far enough, the numeric values of the variables are also printed in the table. Readers may select subsets of cases via a mouse, for example (after doing so, the selected rows appear in yellow, shown as light gray in this paper). By clicking on a column heading, the user selects the variable in that column. Authors may include any of the standard control widgets available through HTML, such as: check box button, radio button, input box, or drop-down choice menu. In addition, authors may attach a JavaScript function call directly to an HTML link.

From step 406 the process proceeds to step 408 where the author sets the data parameters of the chosen view type. This selection process may be iterative and may interplay with the selection of a view type in step 406. The data parameters include parameters that an end-user, may use to modify the view presented by the live document. Data parameters associated with a bar chart may include, but are not limited to, the horizontal or vertical orientation of the bar chart, the orientation of the bars within the chart, axis labels, whether the axis labels are displayed, use of color or other visual indicators with each of the bars, the amount of space, if any, left between the bars, for example. In step 408 the author of the document determines which of these or other data parameters he wishes to provide to a reader (an end-user) for use by the reader in manipulating the displayed data. From step 408 the process proceeds to step 410 where the author sets other, non-data, parameters of the view, such as the manner in which the visualization system draws the data. That is, an author may determine in step 410 whether a bar chart is drawn with horizontal or vertical bars, for example. From step 410 the process proceeds to end in step 412.

Figure 5:
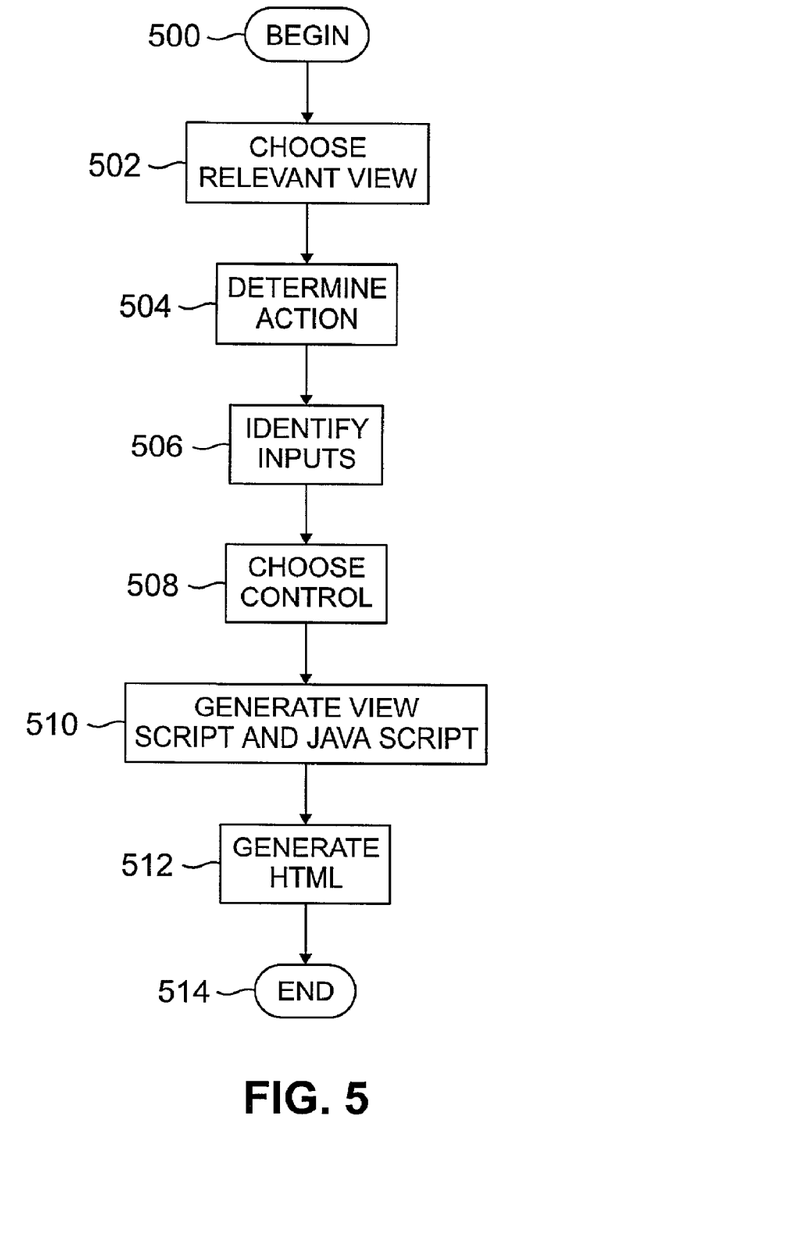
FIG. 5 is a flowchart which depicts the process of creating an interaction in accordance with the principles of the present invention.

The process of creating an interaction described briefly in relation to the discussion of process steps 320 and 322 of FIG. 3 is described in greater detail in relation to the flowchart of FIG. 5. The process begins in step 500 and proceeds from there to step 502 where the author choose the view that will be affected by the interaction being created. That is, since commands are sent to one of the applets on the HTML page (including text, applets, links, etc.) being created as a part of the interaction, the user must pick a "relevant view". If the author is, for example, setting a parameter of a particular view, that view is the view selected in step 502. After selecting a view in step 502, the process proceeds to step 504 where the author determines the interaction desired. A data visualization system in accordance with the principles of the present invention permits an author to select "actions", from a list or through a graphical user interface, for example, that a reader of the live document may want to employ to better understand the data presented by the author. For example, an author may want to allow a reader to change view parameters, select a subset of the author's data for viewing, or select specific data for display. Whatever such actions the author may want to allow a reader to take may be determined by an author in step 504.

From the selection of the action in step 504 the process proceeds to step 506 where the author specifies the input from a reader required by the action selected in step 504. For example, if the action chosen in step 504 is selecting a data subset, a reader could select the data subset using a variety of inputs and, in step 506, the author specifies what those inputs will be. When the action specified by an author allows a reader to select a data subset, the author may specify the selection of values greater than "X", less than "X", or other delineation, for example, as an input. The author may enable such a value selection on the part of a reader in a number of ways, including a selection from a list of options or a selection using graphical methods.

In step 508 the author specifies control widgets that are appropriate for the inputs set forth in step 506. For example, an action that requires no inputs may be implemented with a link or a button as a control widget. A drop-down list a set of radio buttons, or a set of checkboxes may be appropriate for an action which accepts a reader's input in the form of a selection from a fixed set of options. A text input field may be employed to permit a reader to enter a less constricted input to an action. Other control widgets are contemplated within the scope of the invention.

Figure 7:
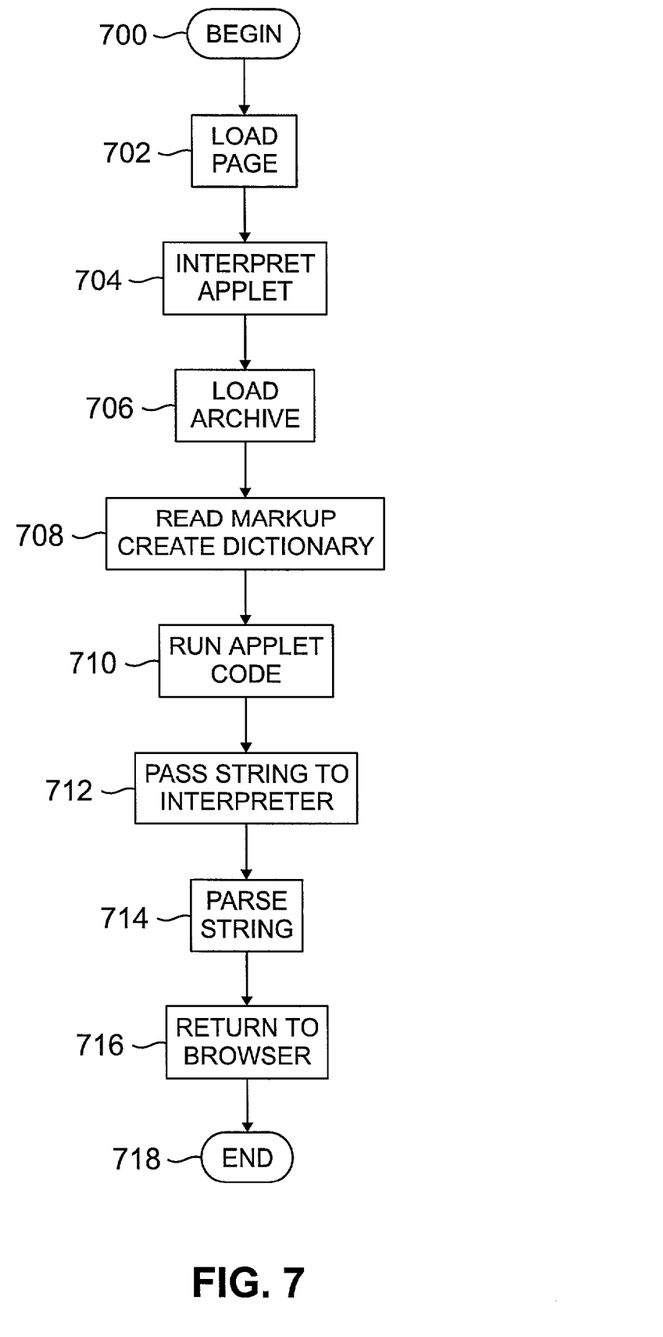
FIG. 7 is a flowchart which depicts the operation of a view scripting language in accordance with the principles of the present invention.

After choosing the appropriate control widgets in step 508, the process proceeds to step 510 where the visualization system generates the view script (view script is described in greater detail in the discussion related to FIG. 7) to perform the action selected in step 506 and generates JavaScript to send the view script to the relevant view. From step 510 the process proceeds to step 512 where the visualization system generates HTML to create the control chosen in step 508. The system also generates the HTML for running the generated JavaScript in response to the activation of the control by a reader. That is, the HTML generated by the visualization system is responsive to widget activation by calling JavaScript which, in turn, sends a command in a view-scripting language (described in the discussion related to FIG. 7) to the relevant view. From step 512 the process proceeds to end in step 514.

An author enables a reader's data visualization interaction by creating the interface, views, actions, and control responses for the interaction, as set forth in the discussion related to FIGS. 3, 4, and 5. As described in greater detail in the discussion related to FIG. 6, to create a reader interaction, an author may include markup in an HTML document which markup makes use of a scripting language, such as JavaScript, that allows the HTML page to perform simple commands. For example, the JavaScript commands send strings to applets on a page, and the applet interpret the strings as a view scripting language, such as MMVZ, the operation of which is described in the discussion related to FIG. 7.

For example, the following markup creates a link that invokes a JavaScript command:

'SELECT EXPRESSION expr='f==0' f=@col table=@tab;')
<A href="javascript:document.applets[BC1].doScript ('SELECT EXPRESSION expr='f==0' f=@col table=@tab; ')">choose 0 a<a/A a>

In the browser, this markup appears as the phrase "choose 0" with highlighting (such as underlining, and/or use of a different color) displayed. When a reader "clicks on" this phrase, the browser recognizes the click as having occurred over a link, and activates the link. As a result of activating the link, the browser interprets the text of the HREF and, based on the prefix "javascript" determines that this is a JavaScript command. The browser passes the rest of the HREF to a JavaScript interpreter, which may be included as another component of the browser. The JavaScript interpreter parses the string and determines that it, that is, the browser, should invoke a method of the Java applet on the page with the name "BC1". The interpreter locates the applet by that name. The JavaScript interpreter invokes the method doScript of the applet, passing it the argument string 'SELECT EXPRESSION expr='f==0' f=@col table=@tab;'

At this point, a view scripting language in accordance with the principles of the present invention, MMVZ, takes over operation by running the doScript method of the applet. The doScript method passes the string to the MMVZ script interpreter, which parses and executes the string. In this example the string causes the column identified by the variable @col in the applet (for example, in the example related to FIG. 7, the field 2 column of the table) to be examined and every row where that column has a value of 0 is selected.

Figure 6:
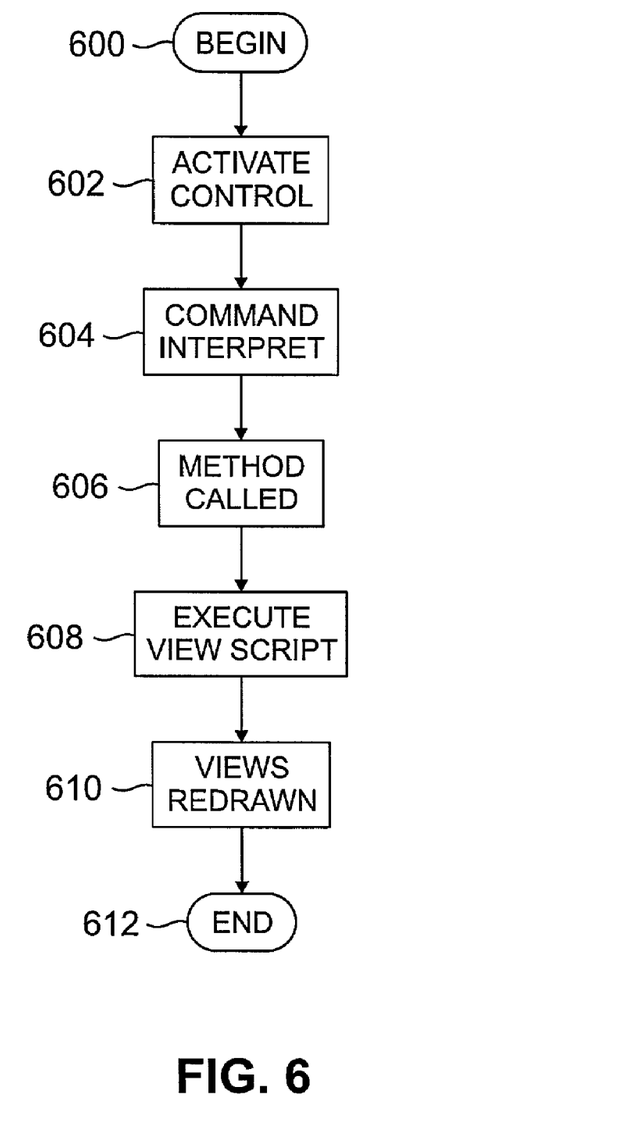
FIG. 6 is a flowchart which depicts the process of a reader using an interaction such as one that may be created in the process described in the discussion related to FIG. 5.

A reader may engage in such an interaction through a process as described in the discussion related to FIG. 6. The process begins in step 600 and proceeds from there to step 602 where a reader activates a control, using a control widget such as described in relation to step 508 of FIG. 5. Such activation may entail, for example, a reader "clicking on" a link or a button, typing into a text box, choosing from a pull-down, choosing one or more checkbox buttons, or using radio buttons to choose. Once the reader activates the control in step 602, the process proceeds to step 604 where the JavaScript command associated with the control is interpreted. In one aspect of the invention, if the data visualization system employs the Internet for presentation of the live document to readers, a browser interprets the JavaScript command in step 604.

From step 604 the process proceeds to step 606 where JavaScript calls the Java method of the relevant applet with view script. After the Java method is called in step 606 the process proceeds to step 608 where the applet executes view script to change state. This change in state includes the alteration of a view and the modification of parameters related to how the view is drawn. For example, parameters related to whether a bar chart is drawn with horizontal or vertical bars may be modified in this step. In step 610 the views are redrawn according to state change of step 608. From step 610 the process proceeds to end in step 612, where the state change is sent to all applets.

In accordance with the principles of the present invention, a reader may be provided with a command language which permits a reader to change views without using a graphical user interface. Such a command language may include commands for panning, zooming, the selection of data subsets, the sorting of columns or bars, and finding a subset of records with specified values. Additionally, APPLETs may execute a scripting language, as noted in the discussion related to FIGS. 5 and 6, to change state, for example. That is, in one aspect of the invention, the views and user interactions in a live document may be programmed using a scripting language referred to herein as the "MMVZ scripting language". The scripting language is embedded in the HTML document as strings. These strings can appear in an APPLET markup to create a view, or in other forms of markup to define a user interaction. The strings are read by the browser using browser techniques such as the interpretation of markup by the browser itself and the interpretation of embedded JavaScript commands. As a result of this interpretation, the strings are passed to one of the Java applets on the HTML page. The applet then interprets the string and executes the command or commands in the string.

For example, to create a view, the HTML document may include an APPLET markup such as the following:

<APPLET NAME=BC1 HEIGHT=200 WIDTH=400
    ARCHIVE="jars/mmvz.jar"
    CODE="com.lucent.vis.mmvz.util.MMVZApplet">
    <PARAM NAME=SCRIPT VALUE='
    @src:=GET DataSource location="file:/examples/data.html";
    @tab:=GET Table source=@src colNames=field1,field2, field3;
    @col:=EXEC @tab getColumn name=field2;
    @view:=GET BarChart t=@tab col=@col;
    EXEC @_setView view=@view;
    '>
    </APPLET>

This markup defines an applet that will be run by a browser when this page is displayed. In this illustrative example, the applet has the name BC1, a height of 200 pixels, and a width of 400 pixels. The applet will run compiled Java code, found in the archive jars/mmvz.jar. The applet code com.lucent.vis.mmvz.util.MMVZApplet from that archive file is run by the applet.

The applet includes one parameter, named SCRIPT, which has as its value a string, representing a program in the MMVZ scripting language. In this example the script creates a simple bar chart view, as described in the discussion related to FIG. 7 which begins in step 700 and proceeds to step 702 where a browser loads a page with the above markup. From step 702 the process proceeds to step 704 where the browser interprets the APPLET markup. In this illustrative example the browser allocates a 200 by 400 pixel region of the page in which the applet will be displayed. The process then proceeds to step 706, where the browser loads the archive file jars/mmvzjar, which contains compiled Java code. Additionally, the browser finds the code for the applet com.lucent.vis.mmvz.util.MMVZApplet in the jars/mmvz.jar archive.

In step 708, the browser reads the <PARAM> markups nested in the APPLET markup, and creates a dictionary of name-value pairs. In this case the dictionary will contain one pair; when the name "SCRIPT" is looked up in the dictionary, the value "@src:=GET DataSource . . . " will be returned. From step 708 the process proceeds to step 710 where the browser begins running the applet code.

From step 710 the process proceeds to step 712 where the applet examines the dictionary created in step 708 and uncovers the "SCRIPT" variable. The applet then passes the SCRIPT string (that is, @src:=GET DataSource, in this example) to the MMVZ scripting language interpreter. In step 714 the MMVZ scripting language interpreter parses the string into five commands and executes them in order. The first command relates to the string: @src:=GET DataSource location="file:/examples/data.html", and creates a new data source object named @src which will read data from the URL "file:/examples/data.html". The next command derives from the string: @tab:=GET Table source=@src colNames=field1,field 2, field3; and creates a new table object named @tab by reading from the DataSource @src. This table object will include three columns named field1, field2, and field3. The interpreter interprets the string: @col:= EXEC @tab getColumn name=field2; as a command to create an object named @col by extracting a Column object named field2 from the Table @tab. The interpreter then creates a BarChart view object named @view in response to the string: @view:=GET BarChart t=@tab col=@col; which displays the Column @col from the Table @tab. Finally, in response to the string: EXEC @_setView view=@view; the interpreter sets the view displayed by this applet (identified by the variable @_) to the BarChart @view. The process then proceeds to step 716 where control is returned to the browser. In step 716 the browser continues to run the Java code defining the applet, which causes the bar chart view to be displayed. From step 716 the process proceeds to end in step 718.

Table 1 includes various types of view configurations, such as may be created in the process described in the discussion related to FIG. 4, which a reader may employ in a data visualization process. The parameters for the applet tag are specified in name/value pairs of text, as described in the discussion related to FIG. 7. If views share the same string in the url parameter, those views are linked together, in the sense that when the user highlights a subset in one view, the same subset is automatically highlighted in another view. Views that have a common url parameter share the same data, thereby reducing the download time of the presentation. The Join parameter allows linking of data from two data sources by specifying variables to match in the two sources.

TABLE 1

| PARAMETER | EFFECT |
| --- | --- |
| Data Source | |
| uri | set the data source |
| Show | select a subset of data records to view |
| Variable | identify which data fields to show |
| Initial State | |
| SortBy | set sort criteria for the initial state |
| Highlight | highlight a subset of the data |
| Transform | control visual representation of the data |
| Show Policy | display all case or only selected cases |
| doCommand | execute a command that changes the state of the view |
| Linking Views | |
| Join | link views from different data sources |

A visualization system in accordance with the principles of the present invention includes a set of visualization components which an author may use to compose a live document using HTML to form a web page, for example. The visualization components may be directly manipulated by a reader in order to explore and analyze data. Such a document may take the form of a web page, An author may link among the components, initialize controls for the components and customize the controls. An author may set the initial state of the live document to visually highlight certain data for a reader and may target different audiences with different visual highlight/initial state combinations. An author defines an initial state by setting one or more parameters of an associated view applet. By linking interactive views, an author may permit a reader to visually confirm and further explore an author's conclusions regarding the document's associated data and to further explore the data himself. An author may script a reader interaction with the visualization system in order to further engage a reader and to minimize the reader's efforts related to navigating the data.

Control widgets may be implemented as Java applets or as JavaScript components. The use of JavaScript components has the advantage of smaller size and greater extensibility. That is, with the use of JavaScript readers need not wait for control widget applets to load and authors are freed from programming new controls in Java whenever a new view or functionality is added to a live document. Authors may script views using a language, such as the previously described view scripting language MMVZ which may provide an alternative to a graphical user interface.

A data visualization system in accordance with the principles of the present invention includes configurable views which an author may add to a web page using an HTML applet markup. In one aspect of the invention, a public command type interface to views, which permits commands to be sent through a browser, allows authors to script initial state of a view or to provide alternatives to a graphical user interface, such as a speech input interface. An author may add calls to a JavaScript library of functions such as the sorting of bar charts and dynamic tables, selecting data within a view, or animating a selection within a bar chart. The author may implement a "record function" which allows a reader to record and save a sequence of interactions in the form of a scripting language and to replay a specific sequence of views from an interactive session, thereby allowing a reader to customize a version of the document which may be replayed at a later time. In an illustrative embodiment, inking between views is handled through a form of publisher/subscriber methods. Consequently, any new view developed within the bounds of the linking model can be added and linked to any existing views without recompiling or modifying the existing views. An author can create new views using any of a group of available views or combine existing or new views.

Applet initialization parameters allow authors to set the initial state of a view rather than presenting a view in some default state. For example, rather than presenting a set of linked views in a default state where all data items are selected, an author may set the initial state to highlight a data subset of interest. In this way, the initial state can be used to automatically present and emphasize an interesting result upfront, without requiring interactions from the user. Scriptable user interactions in accordance with the principles of the present invention allow authors to provide simple links or control widgets to the readers. Scripts provide readers with quick access to other states of a set of views, thus enabling them to focus on various results and perspectives that a set of views can provide, rather than being distracted by the mechanisms used to get to a particular state (including view and parameters). Additionally, the scripts free authors from explaining how to accomplish various user interactions and enable authors to provide a series of user interactions in a single script. For example, if an author wants readers to sort a bar chart by size and select the top three bars in the view, the author can script, "Looking at the top three bars, we see that . . . ", with the words "top three bars" being a link (that is, an href in HTML) to the script for sorting the bar chart and selecting the top three bars. In this way an author may provide access to user interactions in context. Without scripted user interactions, an author may be required to include instructions such as, "To select the top three bars, first click the right mouse button in the bar chart to access the submenu and select 'Sort by Count' to order the bar chart by height. Then, use the left mouse button to select the top three bars in the chart", in order to permit a reader's interaction.

A data visualization system in accordance with the principles of the present invention may present relatively small and simple views in order to minimize the overhead cost of accessing the online document for visualization. Additionally, only the data required for a specified view is downloaded, rather than the entire data set. Scriptable links and control widgets allow an author to place the links and control widgets in context, as just described, in order to allow a user to interact with the live document in a more natural, intuitive manner. An author may compose a presentation of results to a reader by selecting from a set of views of the data which a reader is to visualize. In accordance with the principles of the present invention, an author may link views, whereby a reader's selection in one view is automatically propagated to all linked views.

Figure 8:
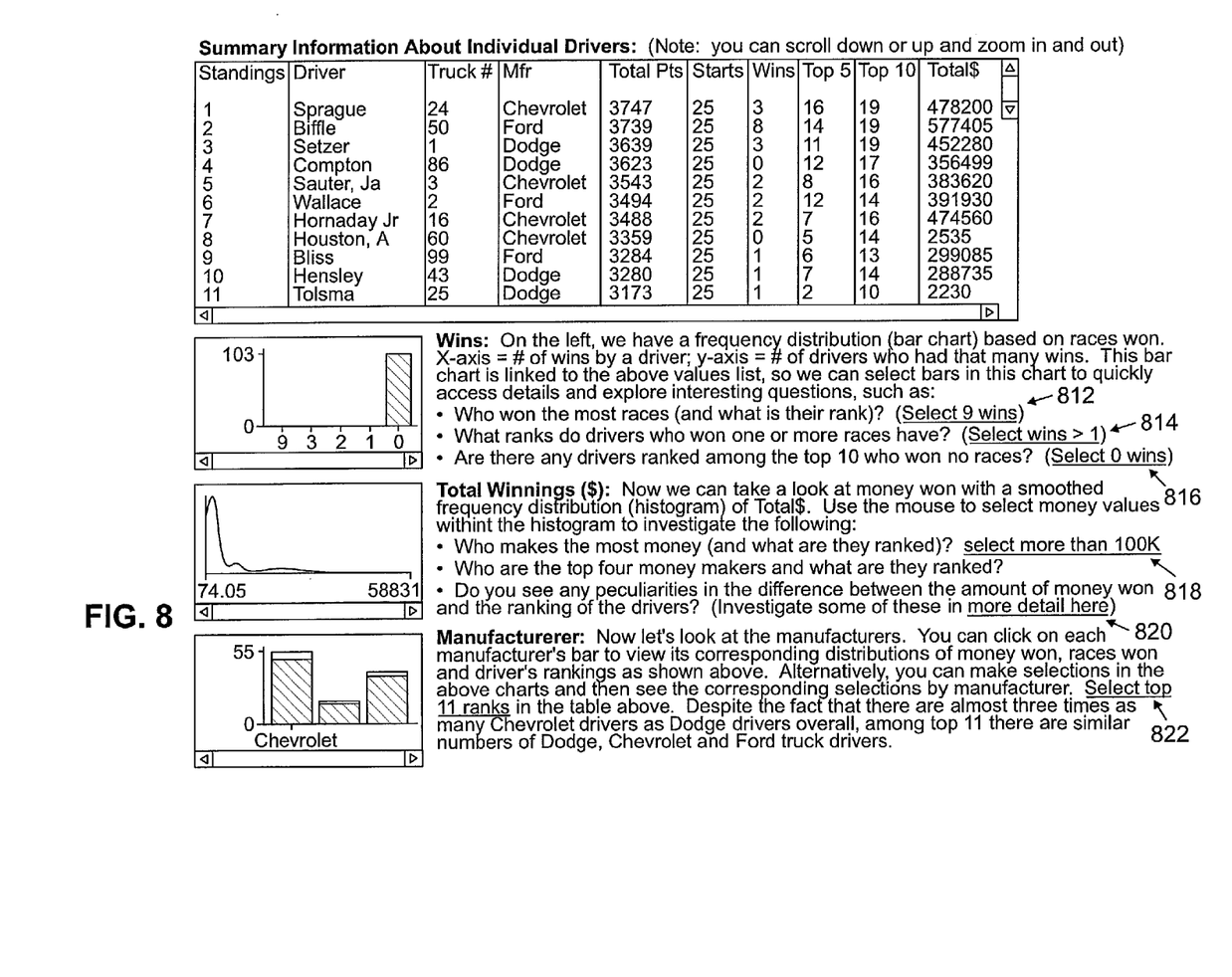
FIGS. 8, 9 and 10 are illustrative live document output pages, including text, view, and interaction objects such as may be authored and read in accordance with the principles of the present invention.

FIG. 8 depicts a live document display output in accordance with the principles of the present invention. FIG. 8 includes a dynamic table view 830 of data related to the National Association of Stock Car (NASCAR) 1999 Craftsman Truck Series of races. The dynamic table 830 contains information about drivers, such as their position in the season points standings, their truck manufacturer, and summary information about race results such as numbers of top ten finishes and total prize money. The dynamic table 800 is linked to the views 832, 834, and 836. The view 832 is a bar chart of drivers' number of wins, view 834 is a smoothed histogram of drivers' prize money, and view 836 is a bar chart of truck manufacturers.

The author of the live document set the initial view of the dynamic table 800 to initially display only the top eleven drivers, thereby limiting the amount of data downloaded to a reader and allowing the author to focus the reader on one aspect of the driving data: the drivers with the greatest number of wins during the season. The author has also scripted text 802 including JavaScript controls to encourage the reader to scroll down 804, scroll up 806 zoom in 808 and zoom out 810 in order to, for example, locate the two drivers who drove in only a few races but won one. The supporting views 832, 834, and 836 are useful for highlighting subsets of the data so that the reader can restrict attention to these subsets when viewing the dynamic table. For example, in the view 832, the reader has selected drivers with zero wins in order to study how high in the standings it is possible to finish without the benefit of a win. The document also contains JavaScript controls 812 Select 9 wins, 814 select wins>1, and 816 select 0 wins, that a reader can click on to follow analyses recommended by the author. These controls are located within the text explaining their usage and in close proximity to the view bar chart view 832.

Readers can also easily view the drivers with the most prize money by interacting with the "total winnings" histogram of view 834 or the related JavaScript controls, select more than 400K 818 or more detail here 820. This helps point out some surprising nonmonotonicities: e.g. the seventh place driver won almost as much as the champion by virtue of having won a $100,000 bonus in the 100th Craftsman truck race. The manufacturer bar chart 836, which includes the JavaScript control 822 Select top 11 ranks, can be used to compare manufacturers: for instance, relatively few drivers use Dodge trucks, but a high percentage of Dodge drivers are successful.

As previously described, a text object may be created using an HTML editor to produce HTML source code. For example, the control 802, a link that allows a reader to scroll or zoom through the dynamic table 800, begins with HTML headers that contain definitions of relevant JavaScript functions. The HTML headers are followed by the presentation text, such as, "Note you can scroll" and includes controls in the form of links and views included via applet tags:

<a href="javascript:doCommand('PAN VERTICAL-10', 'driverlist')">down</a>

The "javascript:" type indicates that the link contains JavaScript code, "doCommand" is a utility function that invokes public method "doCommand" of an applet "driverlist". The first argument is the command to be executed by the applet. As another example, the control 812 which permits a reader to select a racer who has won nine races is also a link:

<a href="javascript:doCommand('REPLACESELECT ORDER SMALLEST','wins')">Select 9 wins.</a>

The link selects the bar within view 832 that contains drivers who won nine races.

The first applet tag describes the Dynamic Table view:

<applet name=driverlist code=spr.views.DTable.class width=700 height=250>
      <param name=url value="drivers.txt">
      <paramname="Variable"value="Standings,Driver, Truck#, Mfr, TotalPts, Starts, Wins, Top5, Top 10, Total$">
      <param name="SortBy" value="Standings">
    </applet>

The "url" parameter specifies a URL for the data to be displayed in the table. The "Variable" parameter lists the variables to be displayed in the table. The last parameter indicates that the table will initially be sorted by the column named "Standings". The second applet is a bar chart of number of wins:

<applet name=wins code=Idoc.BarApplet.class width=175 height=130>
      <param name=url value="drivers.txt">
      <param name="Variable" value="Wins">
    </applet>

Figure 9:
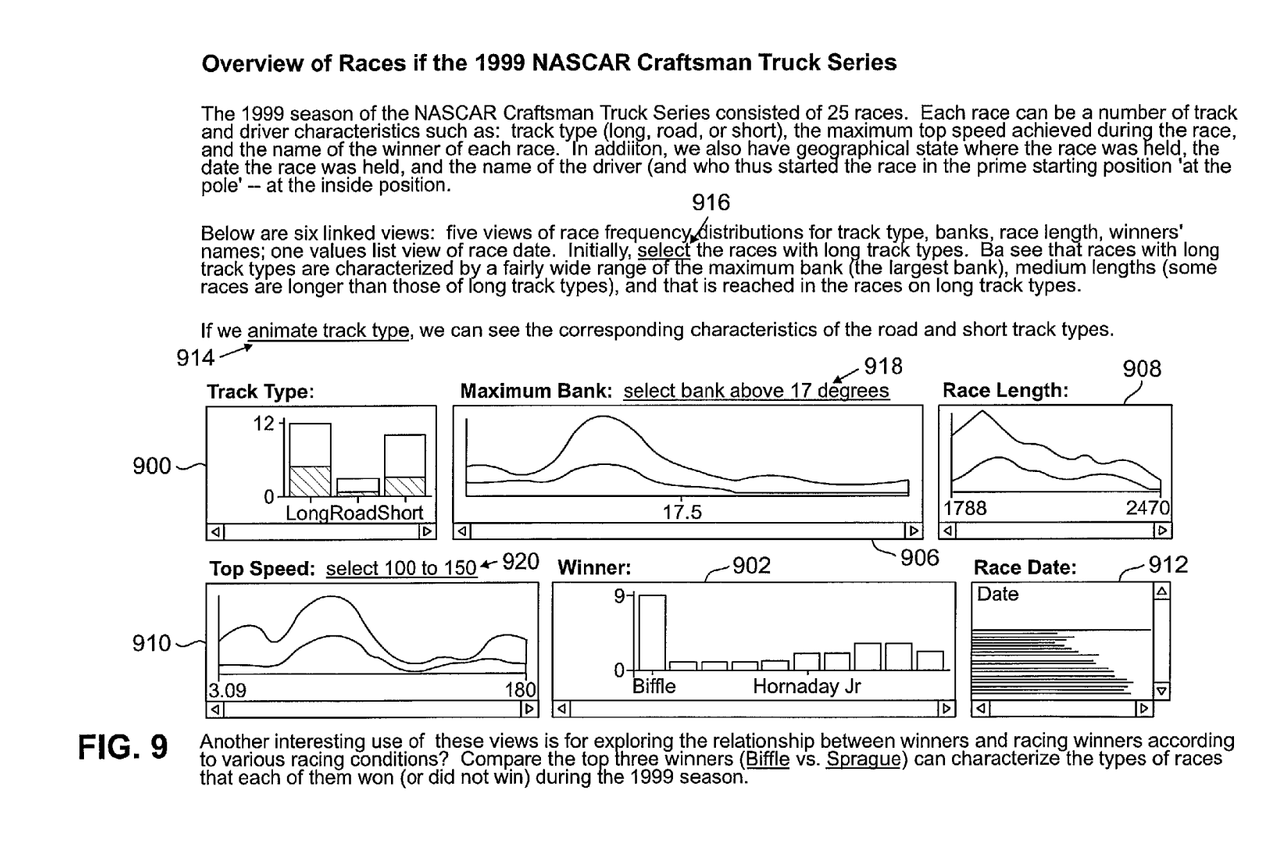

The live document of FIG. 9 focuses on the study of the truck races included in the 1999 season. Bar charts categorize the races by the track type 900 (long or short oval or road course) and race winner 902. Smoothed histograms display distributions of angle of banking of the track 906, track length in miles 908 and the speed of the track 910, as measured by the best time by drivers in qualifying. A dynamic table 912 (in the lower right-hand corner of the six views) contains a single column listing information about race dates. A JavaScript control 914 allows a reader to see characteristics of each track type. That is, when a reader clicks on the animate track type control 914, the control loops over the bars in the track type bar chart 900, selecting each in turn, and propagating the selection to the other linked views, so that the reader sees characteristics of each track type in turn. Text recommends comparing the races won by the three drivers who won at least three races: while the three did not differ in preferred speed or track length, Greg Biffle seemed to prefer the flattest (least banked) tracks, Jack Sprague was best at driving at a severe angle, while Dennis Setzer had most moderate tastes. JavaScript controls permit a reader to select 916 races, select a track with a bank above 17 degrees 918, select top speed of a track 920 or fit all data into the dynamic table 922.

Figure 10:
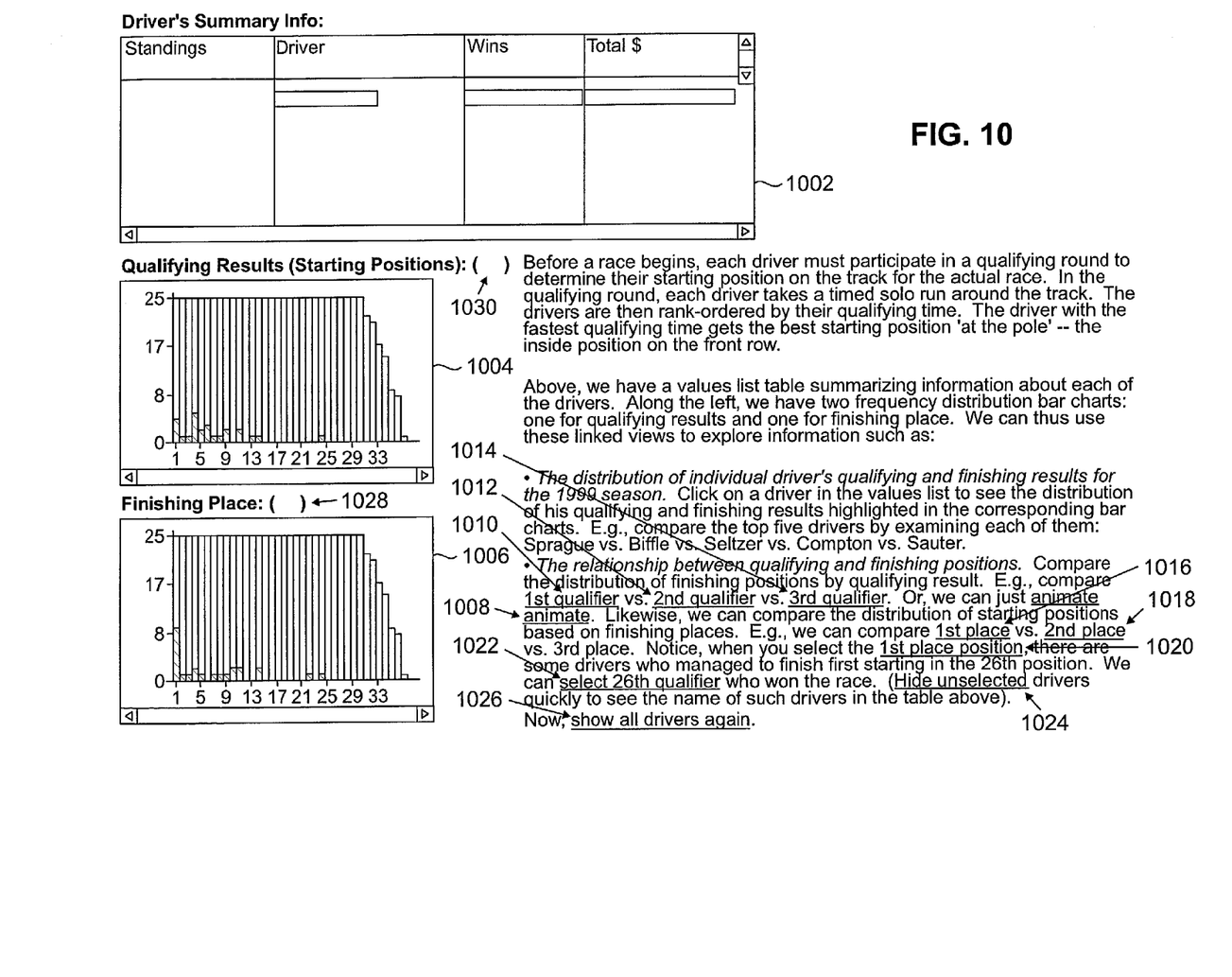

The live document of FIG. 10 permits a more detailed analysis of the drivers results and qualifying performance. The document includes a dynamic table 1002 which contains I summary information about the drivers. A reader may used the table 1002 to highlight the bar charts 1004 and 1006 contained within the live document 1000. The bar chart 1004 contains qualifying information about various drivers. By selecting a specific driver in the dynamic table, as indicated by the highlighting of the driver Biffle's information, the live document highlights related information in the linked views of bar charts 1004 and 1006, with the distributions of Biffie's qualifying and finishing positions highlighted in bar charts 1004 and 1006, respectively. By selecting the top several drivers on the list, a reader may investigate the hypothesis that top drivers tend to qualify better than they finish because more uncontrollable events occur in the course of an entire race.

The live document could be used by a reader to study the correlation between starting and finishing positions. Not surprisingly, faster qualifiers tend to finish higher in the standings. However, as vividly demonstrated by activation of the qualifying results animate control 1008, the distribution of finishing positions for drivers that start in better qualifying positions seems to oscillate, with odd-numbered starting positions being favored. This somewhat counter-intuitive result (due to the fact that the race begins with drivers aligned in two files with the odd numbered positions on the inside of the track) is underscored when a user animates the qualifying results. By selecting the twenty sixth position in the intersect mode a reader can identify the driver who managed to win, in spite of qualifying in twenty sixth place (intersect mode, addition/union, and other data selection modes may be implemented through the use of control key, or other key combinations). Additional controls included in the live document by the author allow a reader to compare first qualifier 1010 vs second qualifier 1012 vs third qualifier 1014. A reader may employ control 1016 to access first place data and compare it to second place 1018 or third place 1019. There are controls for the selection of first place finish 1020 twenty sixth qualifier 1022, to hide unselected drivers 1024, and to show data for all drivers 1026, with text indicating proposed interactions via those controls, with the controls placed in context within the text. Controls are also available for animating qualifying results 1030 and finishing place 1028.

A software implementation of the above described embodiment(s) may comprise a series of computer instructions either fixed on a tangible medium, such as a computer readable media, e.g. diskette 242, CD-ROM 247, ROM 215, or fixed disc 252 of FIG. 2, or transmittable to a computer system, via a modem or other interface device, such as communications adapter 290 connected to the network 295 over a medium 291. Medium 291 can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results.

Processes illustrated through the use of flow charts may not be strictly linear processes and alternative flows may be implemented within the scope of the invention. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A computer program product for use with an interactive display system capable of receiving input signals from an input device, the computer program product comprising a non-transitory computer readable medium having computer readable code thereon comprising:
   code for providing visualization objects to a live document author;
   code for responding to the selection of visualization objects by the author by incorporating the selected objects into a live document;
   code for incorporating a view scripting language as a string in a hypertext markup; and
   code for saving the live document as a hypertext markup, wherein the code allows a client to record and replay a sequence of interactions with the live document.

2. The computer program product of claim 1 further comprising: code for providing a view object for use by a live document author.

3. The computer program product of claim 2 further comprising: code for providing a dynamic table view object for use by a live document author.

4. The computer program product of claim 1 further comprising: code for providing a text object for use by a live document author.

5. The computer program product of claim 1 further comprising: code for providing an interaction object for use by a live document author.

6. The computer program product of claim 1 further comprising: code for linking view objects in response to a selection by the live document author.

* * * * *